United States Patent
Zhang

(10) Patent No.: US 7,355,972 B2
(45) Date of Patent: Apr. 8, 2008

(54) SCHEDULING METHOD OF REALIZING THE QUALITY OF SERVICE OF ROUTER IN INTEGRATED SERVICE

(75) Inventor: Wei Zhang, Guangdong Province (CN)

(73) Assignee: Huawei Technologies Co., Ltd., Shenzhen, Guangdong Province (CN)

(*) Notice: Subject to any disclaimer, the term of this patent is extended or adjusted under 35 U.S.C. 154(b) by 882 days.

(21) Appl. No.: 10/477,313

(22) PCT Filed: Mar. 13, 2002

(86) PCT No.: PCT/CN02/00150

§ 371 (c)(1),
(2), (4) Date: Nov. 10, 2003

(87) PCT Pub. No.: WO02/091757

PCT Pub. Date: Nov. 14, 2002

(65) Prior Publication Data

US 2005/0044263 A1    Feb. 24, 2005

(30) Foreign Application Priority Data

May 8, 2001    (CN) .............................. 01 1 17978

(51) Int. Cl.
*H04L 12/26* (2006.01)

(52) U.S. Cl. ................ 370/235; 370/412; 370/468
(58) Field of Classification Search ................ 370/235, 370/429, 395, 412, 413, 418, 428
See application file for complete search history.

(56) References Cited

U.S. PATENT DOCUMENTS

| 6,091,709 A * | 7/2000 | Harrison et al. ............. 370/235 |
| 6,744,767 B1 * | 6/2004 | Chiu et al. .............. 370/395.21 |
| 2001/0026535 A1 * | 10/2001 | Amou et al. ................. 370/235 |

FOREIGN PATENT DOCUMENTS

| CN | 1336747 | 8/2001 |
| KR | 2001000087 | 1/2001 |
| WO | WO 0163855 | 9/2001 |

* cited by examiner

Primary Examiner—Ricky Q. Ngo
Assistant Examiner—Wei-po Kao
(74) Attorney, Agent, or Firm—Wolf, Greenfield & Sacks, P.C.

(57) ABSTRACT

In a dispatching method available for high quality service of a router in an integrated service, the classified data package is inserted in three different service queues in the entering queue step, and calculated GRC determine the order of when the data package will be sent according to a provided virtual clock, upon which an outting queue step processing three queues in different ways and sending them to improve fairness and efficiency of the dispatching.

18 Claims, 2 Drawing Sheets

SCHEDULING METHOD OF REALIZING THE QUALITY OF SERVICE OF ROUTER IN INTEGRATED SERVICE

BACKGROUND OF THE INVENTION

1. Technical Field of the Invention

This invention relates to an integrated service method for providing end-to-end high quality service on a router, more particularly to a dispatching method in the integrated service.

2. Background of the Invention

Integrated service of conventional router is accomplished by three function modules of the router: admission and control module, classifying module, dispatching module.

Admission and control module is responsible for setting up classifying state table and dispatching queue. When receiving a reservation request, the connecting and founding mechanism examines whether there is enough resource according to the request appointed in the information through admitting control to determine if the call is admitted. If there is enough resource, the call is admitted, and a corresponding classifying term is inserted in the classifying table.

Classifying module is responsible for inserting data package of different streams in different dispatching queue, which is realized by examining the head of the data package.

Dispatching module decides that each stream conforms with its reservation request in the requirement of QoS. The dispatching arithmetic will decide to transmit the next data package of which queue.

In the integrated service, there is best-trying service, load-controllable service and guaranteeing service. The guaranteeing service must guarantee to meet certain requirements in end-to-end delay and link bandwidth. The load-controllable service is not of certain requirements in delay but do be of certain requirements in link bandwidth, and the package loss and delay at certain range is acceptable; best-trying service means the data package in the case of jammed network can be abandoned.

The dispatching arithmetic is established upon fairness and efficiency during the queue-dispatching. Generally, a weight fairness queue (WFQ) is adopted. In WFQ, each port sets up a queue for the data package of each date stream, i.e., if N data streams pass the port, there are N queues at the port. The queues are serviced circularly. The most original WFQ is based on bit stream. Each stream fairly shares the bandwidth of the port according to certain predetermined weight. If $r_f$ is the weight of stream f. And $S_f(t_1, t_2)$ is data quantity when stream f is transmitted in all at $[t_1, t_2]$. Then for data stream f and m, lengths of queues both above zero, the equation is:

$$\frac{S_f(t_1, t_2)}{r_f} - \frac{S_m(t_1, t_2)}{r_m} = 0$$

In practical application, data is sent by data package but not by bit, thus

For data package dispatching, WFQ makes that $$\left| \frac{S_f(t_1, t_2)}{r_f} - \frac{S_m(t_1, t_2)}{r_m} \right|$$

near to be zero. If N data streams are transmitted in system, reserved weight is $r_1, r_2, \ldots, r_N$, $S_i(t_0, t)$ represents service quantity provided by stream i in $(t_0, t]$, and within $(t_0, t]$, there are always some overstocked data packages in the stream i, $$\frac{S_i(t_0, t)}{S_j(t_0, t)} \geq \frac{r_i}{r_j} \quad j = 1, 2, \ldots, N$$

This equation is always available. For all j of the above equation, $$S_i(t_0, t) \sum_j r_j \geq r_i \sum_j S_j(t_0, t) = r_i(t - t_0)r$$

Wherein, r represents total bandwidth. Service bit rate $$\frac{S_i(t_0, t)}{t - t_0}$$

for stream i is no less than the reserved bit rate $$\frac{r_i}{\sum_j r_j} r.$$

WFQ is the weight circular service of the analog bit stream. In one circle, service quantity of each stream is proportional to the weight of each stream. Since sometimes data package can not be provided the service by bit, WFQ dispatches data packages upon the increasing sequence of the departing time thereof logically to enable the analog of bit stream circle. In order to calculate the departing sequence, WFQ further sticks 2 time labels for each data package: a starting label and an ending label. Supposing that $p_f^j$ and $l_f^j$ is respectively the jth data package and length of stream f, $A(p_f^j)$ is arriving time of $p_f^j$, the starting label $S(p_f^j)$ of $p_f^j$ and ending label $F(p_f^j)$ is defined as:

$$S(p_f^j) = \max\{v(A(p_f^j)), F(p_f^{j-1})\} j \geq 1$$

$$F(p_f^j) = S(p_f^j) + \frac{l_f^j}{r_f} \quad j \geq 1$$

Wherein $F(p_f^0) = 0$. $v(t)$ means that which circle is processed at moment t in the case of simple bit stream. WFQ dispatches data package according to size of the ending label.

The process of realizing WFQ comprises: calculating the starting label and the ending label of the data package, entering the corresponding queue, recording the ending label of the last data package of each data stream in the classifying table. When there enters the jth data package of a data stream, the ending label of the j–1th data package is gotten by classifying, and the starting label and the ending label of the jth data package can be calculated accordingly. $p_f^j$ is added to the end of the queue corresponding to the stream f. Since $F(p_f^{j-1}) < F(p_f^j)$, the queue corresponding to each stream is sequenced according to size of the ending label.

When a dispatch is output, at each port, the data package with the minimum value of ending label is found from head element of all queues to send.

The dispatching method of WFQ is common in achieving quality of service (QoS) of router, also recommended by IETF, when achieving integrated service, it is adopted by many manufacturers, but as WFQ is used in integrated service, these three service queues including the best-trying service, the load-controllable service and the guaranteeing service are processed in a same way, what is used to determine the standard to send data package is the value of ending label of the head element of all queues. In fact, the broader the bandwidth is, the better the best-trying service and the load-controllable service are; the requested bandwidth is calculated upon the end-to-end delay to meet the requirement. If the ending label of some head elements of guaranteeing service queues reaches the minimum at some moment, even if it does not reach the predefined delay, the element will be sent and occupy certain bandwidth of the port.

SUMMARY OF THE INVENTION

The object of the invention is, according to the drawback of the prior art, to provide a dispatching method available for high quality service of a router in integrated service by processing different service queues in different ways to improve fairness and efficiency of the dispatching.

To get above objects, technical scheme of the present invention is: a dispatching method available for high quality service of a router in an integrated service, comprises the steps of: a step of entering queue step, inserting a data package classified by a classifying module in a best-trying service queue or a load-controllable service queue or a guaranteeing service queue; and outting queue step, selecting the data package from said three types of queues and sending them, and set a virtual clock variable to an initial value, said variable is accumulated by a clock quantity occupied by the sent data package;

In the entering queue step, obtaining a GRC for each received data package is upon the following equation:

$$GRC = \begin{cases} A + \dfrac{L}{R} & A >= LAST\_GRC \\ LAST\_GRC + \dfrac{L}{R} & A < LAST\_GRC \end{cases}$$

Wherein, GRC is a rate-guaranteeing clock, R is a reserved bandwidth for a queue which the data package enters, L is the length of the data package, A is a virtual clock variable when the data package being received, LAST_GRC is the GRC of the data package at the end of the queue which the data package enters, which is equal to A when the data package is empty;

Determine whether (virtual clock variable+length of longest data package/bandwidth of port) is smaller than the minimum GRC of the guaranteeing service queue, if so, select a data package with the minimum GRC from the best-trying service queue and the load-controllable service queue and send it; if no, select a data package corresponding to the minimum GRC of the guaranteeing service queue from guaranteeing service queue and send it.

Since said dispatching method is adopted in the present invention, differentiating data packages of different service queues, especially when (virtual clock variable+length of longest data package/bandwidth of port) is smaller than the minimum GRC of the guaranteeing service queue, even if data package with the minimum GRC of all queues is in the guaranteeing service queue, it is not sent, i.e., on the premise of unaffecting QoS, more reserved bandwidth is set aside for load-controllable service queue and best-trying service queue to decrease data package loss, in turn efficiency and fairness of dispatching is improved, at the same time, virtual clock variable is adopted in the present invention, which enables GRC in dispatching instant lots of data packages to calculate, compare, in turn accuracy of operation is guaranteed.

BRIEF DESCRIPTION OF THE DRAWINGS

The invention will now be described in further detail with specific reference to the accompanying figures wherein.

DETAIL DESCRIPTION OF THE EMBODIMENT

Figure 1:
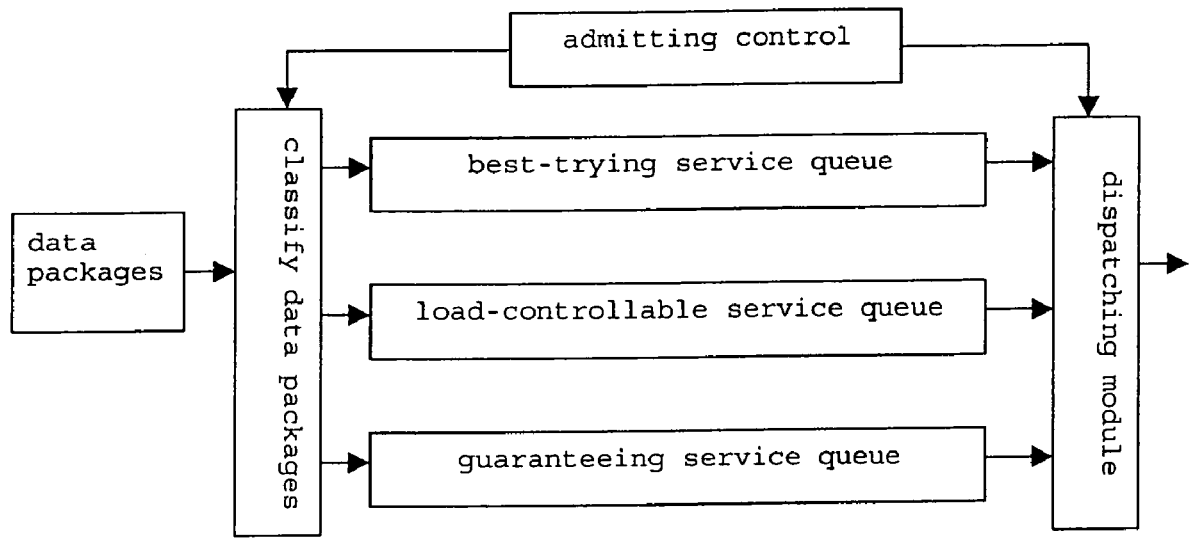
FIG. 1 is the schematic diagram of realizing integrated service on a server.

Referring to FIG. 1, data packages of different streams enter different queues respectively, all queues are classified to three types upon the service standard requirement, wherein there is only one best-trying service queue, and there might be more than one load-controllable service queue and guaranteeing service queue.

Figure 2:
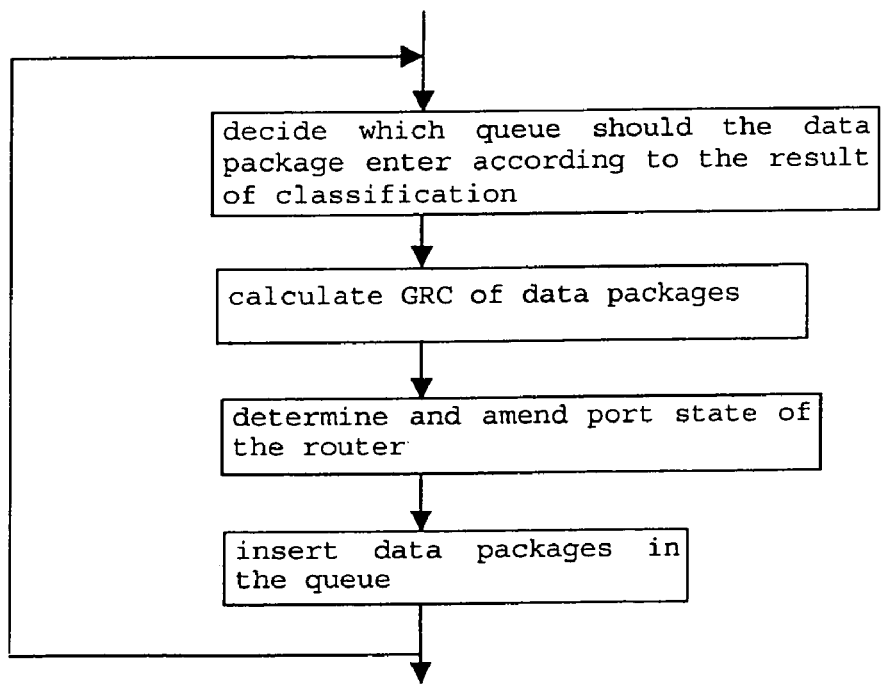
FIG. 2 is the flowchart of an embodiment of entering queue according to the present invention.

FIG. 2 shows a process of data packages entering the queue according to an embodiment of the present invention, the steps are:

Calculating GRC of data packages;

If port state of the router is state two, setting the port state to the state three;

If the port state of the router is state one, setting the port state to the state two;

Inserting the data packages in the queue.

In the step of the entering queue, the rate-guaranteeing clock (GRC) of each received data package shall be calculated. The data packages are sorted by GRC in each queue, since there are many data packages to be processed by router per second, a virtual clock variable is set to calculate GRC, the variable is set initial value as power on, e.g., reset. During the operation, only when there are data packages to send in the outting queue step, the variable can be increased a value. When three queues are all empty, the variable is reset to the initial value. When data packages arrive, their GRCs can be calculated according to virtual clock variable and GRC of data packages at the end of queues that the data packages enter, respectively. In the present invention, port state of the router can be set up to one of three states to be the basis of resetting flowchart control sign and virtual clock variable. State one means the port is not transmitting data; state two means port is transmitting data, but no data package is queuing; state three means there are data packages queue waiting to be output; a port state variable can be set to respectively represent said three states by three different values as 0, 1, 2. In the process for each entering queue, port states are examined, and the port state variable is amended according to current state, the variable can also be dispatched and amended. At state three, repeating the process of selecting sending and outputting data packages and deleting the data packages from the corresponding queue.

Figure 3:
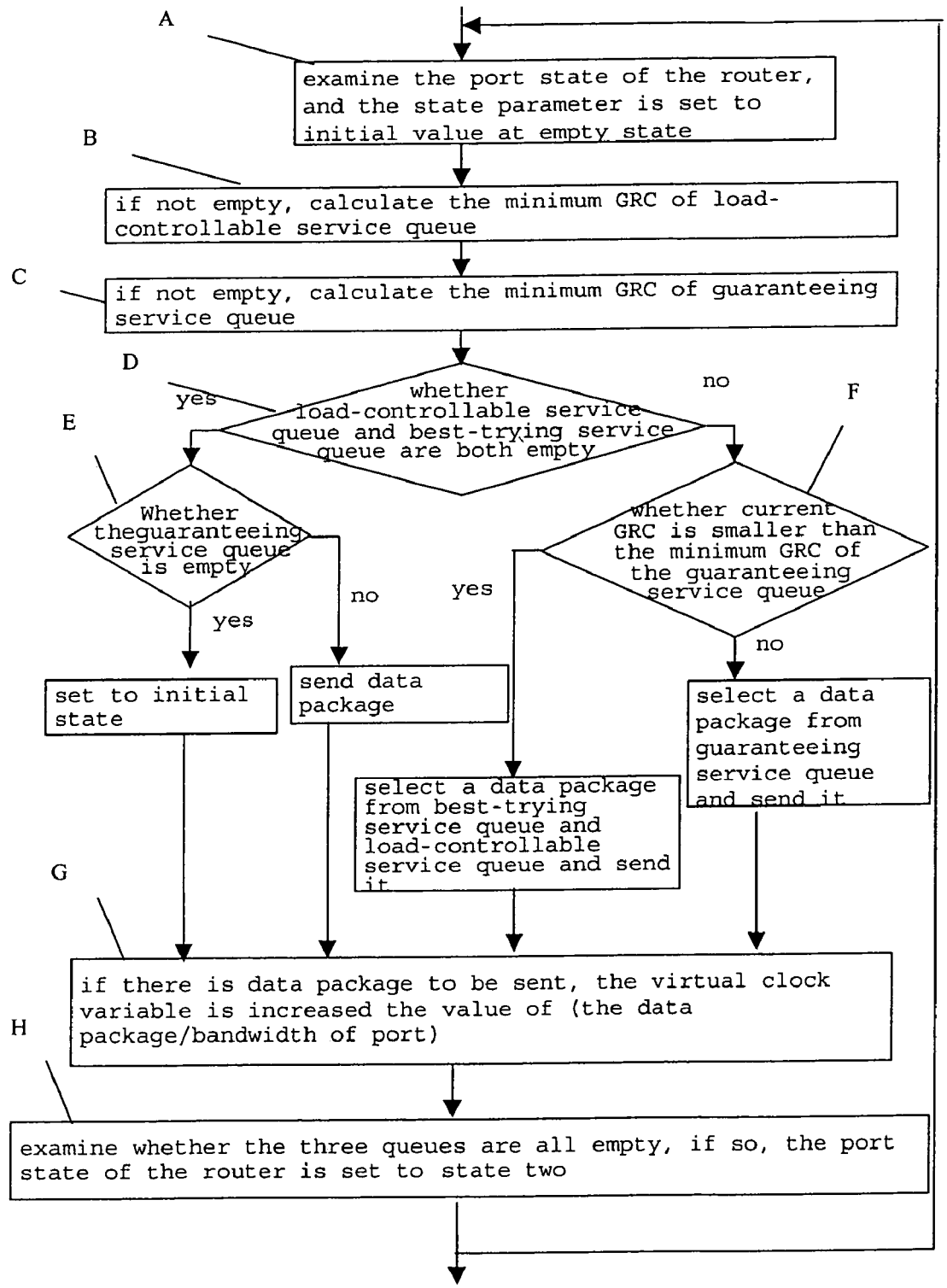
FIG. 3 is the flowchart of an embodiment of outting queue according to the present invention.

FIG. 3 shows a process of data packages outting queues according to an embodiment of the present invention, the steps are:

A. Examining the port state of the router, if it is state three, processing to step B; if it is state two, setting the port state of router to state one, resetting both the virtual clock variable and LAST_GRC of best-trying service queue to their initial values; if it is state one, resetting both the virtual clock variable and LAST_GRC of best-trying service queue to their initial values;

B. If the load-controllable service queue is not empty, calculating the value of the minimum GRC of a head data package in this type of queue in sequencing;

C. If the guaranteeing service queue is not empty, calculating the minimum GRC of a head data package in this type of queue in sequencing;

D. Examining whether the load-controllable service queue and best-trying service queue are both empty, if no, going to step F; if so, going to step E;

E. Examining whether the guaranteeing service queue is empty, if so, the port state of router being set to state one, and the value of virtual clock variable being reset to their initial value; if no, selecting data package corresponding to the minimum GRC of the guaranteeing service queue from the guaranteeing service queue and send it, and deleting the data package from the guaranteeing service queue;

F. Determining whether (virtual clock variable+length of longest data package/bandwidth of port) is smaller than the minimum GRC of the guaranteeing service queue, if so, selecting a data package with the minimum GRC from the best-trying service queue and the load-controllable service queue and sending it, and deleting the data package from corresponding queue; if no, selecting a data package corresponding to the minimum GRC of guaranteeing service queue from guaranteeing service queue and sending it, and deleting the data package from the guaranteeing service queue;

G. If there is data package to be sent, the virtual clock variable being increased the value of (the data package/bandwidth of port).

H. Examining whether the three queues are all empty, if so, the port state of the router being set to state two.

Wherein, step A is used to examine the port state of a router, if there are data packages queuing, going to following steps, otherwise, individual state parameters are set to their initial values, and waiting; step B, C is respectively used to calculate the minimum GRC of the data packages of the load-controllable service queue and the guaranteeing service queue at the non-empty state, and data packages are sorted by GRC in each queue, the minimum GRC can be obtained from data packages of the head. The quantity of the two types of queues are set according to real requirement. If the quantity is fewer, the minimum GRC can be calculated by a bubbling sequencing method with simple arithmetic and time complexity; when the quantity of queues is more, heap sequencing method with small time complexity is preferred, the heap has a structure of complete two-crossed tree, in which all non-leaf nodes are no more than its sub-root nodes, the minimum GRC can be calculated by picking up the top element of the heap. Each time, after the top element of heap is picked up, the value of GRC of the data packages behind the head are inserted and re-adjusted it to a heap; step D is used to examine whether the load-controllable service queue and best-trying service queue are both empty; step B is used to dispatch and send data package of the guaranteeing service queue in case that the load-controllable service queue and best-trying service queue are both empty, and deleting the data package from the queue, moving up the next data package to the head; step F is used to determine how to select data package to send when the three queues are all empty, the determining standard is whether (virtual clock variable +length of longest data package/bandwidth of port) is smaller than the minimum GRC of the guaranteeing service queue, since in practical application, after each dispatching, it is needed to calculate the minimum GRC of individual head of load-controllable service queue and guaranteeing service queue, which enables the virtual clock variable to lapse, the bandwidth of port is defined as to be equal to the actual bandwidth multiplying by 0.9. In Step F, if (virtual clock variable+length of longest data package/bandwidth of port) is smaller than the minimum GRC of guaranteeing service queue, select a data package with the minimum GRC from the best-trying service queue and the load-controllable service queue to send, and delete the data package from corresponding queue, even if data package with the minimum GRC is in the guaranteeing service queue, it is not sent. The dispatching method for outting queue for processing three service queues in different ways is achieved through said steps, only when the best-trying service queue and load-controllable service queue are both empty, their reserved bandwidth can be occupied by the guaranteeing service, however, if (virtual clock variable+ length of longest data package/bandwidth of port) is no less than the minimum GRC of guaranteeing service queue, the data package of the guaranteeing service queue is dispatched preferably. Step G is used to add an adding value to the virtual clock variable in cycle of process of each outting queue, the adding value is equal to the data package/ bandwidth of port; step H is used to examine port state of the router after the data package is sent.

It is known that the person of ordinary skill in the art can execute this invention by selecting different parameter or changing order of the steps and other schemes amended upon the present invention, such amendment shall be in the scope of the claims.

What is claimed is:

1. A dispatching method available for high quality service of a router in an integrated service, comprises the steps of: a step of entering queue step, inserting a data package classified by a classifying module in a best-trying service queue or a load-controllable service queue or a guaranteeing service queue of a port in the router; and outting queue step, selecting the data package from said three types of queues and sending it, the method characterized by: setting a virtual clock variable to an initial value, said variable being accumulated by a clock quantity occupied by the sent data package; in the entering queue step, obtaining a GRC for each received data package upon the following equation:

$$GRC = \begin{cases} A + \dfrac{L}{R} & A >= \text{LAST\_GRC} \\ \text{LAST\_GRC} + \dfrac{L}{R} & A < \text{LAST\_GRC} \end{cases}$$

wherein, GRC is a rate-guaranteeing clock, R is a reserved bandwidth for a queue which the data package enters, L is the length of the data package, A is a virtual clock variable when the data package being received LAST_GRC is the GRC of the data package at the end of the queue which the data package enters, which is equal to A when the data package is empty; said outting queue step comprising steps: determining whether (virtual clock variable+length of longest data package/bandwidth of the port) is smaller than the minimum GRC of the guaranteeing service queue, if so, selecting a data package with the minimum GRC from the best-trying service queue and the load-controllable service queue and sending it; if no, selecting a data package corresponding to the minimum GRC of the guaranteeing service queue from guaranteeing service queue and sending it.

2. The dispatching method of claim 1, characterized by setting a port state to one of three states for determining whether said virtual clock variable is reset to its initial value in the entering queue step or outting queue step, wherein the state one means that the port is not transmitting data; state two means the port is transmitting data, but no data package is queuing; state three means there are data packages queue waiting to be output.

3. The dispatching method of claim 2, wherein the minimum GRC being calculated by a bubbling sequencing method upon individual GRC of a head data package of each queue.

4. The dispatching method of claim 2, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the heap.

5. The dispatching method of claim 1, wherein said bandwidth of port being equal to an actual bandwidth multiplying by 0.9.

6. The dispatching method of claim 5, wherein the minimum GRC being calculated by a bubbling sequencing method upon individual GRC of a head data package of each queue.

7. The dispatching method of claim 5, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the heap.

8. The dispatching method of claim 1, wherein said clock quantity occupied by the sent data package being equaled to (the length of the data package/bandwidth of the port).

9. The dispatching method of claim 8, wherein the minimum GRC being calculated by a bubbling sequencing method upon individual GRC of a head data package of each queue.

10. The dispatching method of claim 8, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the heap.

11. The dispatching method of claim 1, wherein at each port of the router, there being only one said best-trying service queue.

12. The dispatching method of claim 11, wherein the minimum GRC being calculated by a bubbling sequencing method upon individual GRC of a head data package of each queue.

13. The dispatching method of claim 11, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the heap.

14. The dispatching method of claim 1, wherein at each port of the router, there being more than one said loan-controllable service queue and said guaranteeing service queue.

15. The dispatching method of claim 14, wherein the minimum GRC being calculated by a bubbling sequencing method upon individual GRC of a head data package of each queue.

16. The dispatching method of claim 14, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the heap.

17. The dispatching method of claim 1, wherein the minimum GRC being calculated by a bubbling sequencing method upon individual GRC of a head data package of each queue.

18. The dispatching method of claim 1, wherein the minimum GRC being calculated by a heap sequencing method upon individual GRC of a head data package of each queue, said heap having a structure of complete two-crossed tree, in which all non-leaf nodes are no more than sub-root nodes, the minimum GRC being top element of the neap.

* * * * *